United States Patent
Ge et al.

(10) Patent No.: US 10,142,612 B2
(45) Date of Patent: Nov. 27, 2018

(54) ONE METHOD OF BINOCULAR DEPTH PERCEPTION BASED ON ACTIVE STRUCTURED LIGHT

(71) Applicants: Chenyang Ge, Xi'an, Shaanxi (CN); Nanning Zheng, Xi'an, Shaanxi (CN)

(72) Inventors: Chenyang Ge, Shaanxi (CN); Nanning Zheng, Shaanxi (CN); Huimin Yao, Shaanxi (CN); Yanhui Zhou, Shaanxi (CN); Jiankun Lun, Shaanxi (CN)

(73) Assignees: Chenyang Ge, Xi'an, Shaanxi (CN); Nanning Zheng, Xi'an, Shaanxi (CN)

( * ) Notice: Subject to any disclaimer, the term of this patent is extended or adjusted under 35 U.S.C. 154(b) by 491 days.

(21) Appl. No.: 14/591,083

(22) Filed: Jan. 7, 2015

(65) Prior Publication Data
US 2015/0229911 A1    Aug. 13, 2015

(30) Foreign Application Priority Data

Feb. 13, 2014  (CN) .......................... 2014 1 0050675

(51) Int. Cl.
| | |
|---|---|
| H04N 13/128 | (2018.01) |
| H04N 13/254 | (2018.01) |
| H04N 13/239 | (2018.01) |
| G06T 7/521 | (2017.01) |
| G06T 7/593 | (2017.01) |
| H04N 13/00 | (2018.01) |

(52) U.S. Cl.
CPC ........... *H04N 13/239* (2018.05); *G06T 7/521* (2017.01); *G06T 7/593* (2017.01); *H04N 13/128* (2018.05); *H04N 13/254* (2018.05); *H04N 2013/0081* (2013.01)

(58) Field of Classification Search
CPC .. H04N 13/239; H04N 13/128; H04N 13/254; G06T 7/593
USPC .......................................................... 348/47
See application file for complete search history.

(56) References Cited

U.S. PATENT DOCUMENTS

| | | | | |
|---|---|---|---|---|
| 6,262,743 | B1 * | 7/2001 | Allio ................... | H04N 13/0014 345/427 |
| 2011/0043613 | A1 * | 2/2011 | Rohaly ................... | G06T 17/00 348/50 |
| 2012/0253201 | A1 * | 10/2012 | Reinhold .............. | A61B 5/1113 600/473 |

* cited by examiner

*Primary Examiner* — Mikhail Itskovich
(74) *Attorney, Agent, or Firm* — Dragon Sun Law Firm, PC; Jinggao Li, Esq.

(57) ABSTRACT

The present invention provides a method of binocular depth perception based on active structured light, adopting a coded pattern projector to project a coded pattern for structured light coding of the projective space or target object (characteristic calibration), then obtaining the coded pattern by means of two cameras on the same baseline and respectively located symmetrically on both sides of the coded pattern projector, after preprocessing and projection shadow detection, estimating the block matching movement in two modes based on the image blocks (binocular block matching and automatic matching) to obtain the offset of the optimal matching block, finally working out the depth value according to the formula for depth calculation and compensating the depth of the projection shadows to generate high-resolution and high-precision depth information.

8 Claims, 7 Drawing Sheets

ONE METHOD OF BINOCULAR DEPTH PERCEPTION BASED ON ACTIVE STRUCTURED LIGHT

FIELD OF THE INVENTION

The present invention is classified in the field of image processing, human-computer interaction and machine vision technology, specifically involved in a method of binocular depth perception based on active structured light.

BACKGROUND OF THE INVENTION

The vision is the most direct and important way for human to observe and recognize our world. We are living in a three-dimensional world, and the human vision can not only perceive the brightness, color, texture information and movement on the surface of an object, but also distinguish its shape, space and spatial position (depth and distance). Currently, the difficulty in researching the machine vision system is how to get the high-precision 3D depth information in real time and improve the intelligent level of the machine.

In the field of industry, the depth perception technology and devices can provide high-resolution and high-precision 3D depth information, which is widely demanded in automotive safety driving assisting, high-speed machine tool processing, industrial modeling, 3D printing, medical imaging and 3D visual perception in the IOT (Internet of Things). In the field of consumer electronics, the depth perception technology and devices can help to improve the intelligent level and interaction ability of electronic products to bring brand-new man-machine interaction for the users' experience and achieve innovative applications in the smart TV, smart phones, household appliances, and tablet PC, etc.

The depth perception technologies can be roughly divided into passive and active solutions. The traditional binocular stereoscopic vision ranging is a passive ranging method, seriously subject to the impact of the ambient light and featuring a complex stereo matching process. The active ranging method is mainly divided into structured light coding and ToF. Therein, the active visual mode based on structured light coding can get image depth information more accurately, is not affected by the ambient light and features a simple stereo matching process, for example, the somatosensory interaction devices of Microsoft Kinect, the patent for invention of "Depth Perception Device and System" newly applied by Apple Co. in 2013, and the depth photographic device released by Intel in 2014, all of them can actively emit the laser pattern to calculate the depth distance. The depth perception devices currently developed by Microsoft, Apple and Intel all adopt the receiving mode by a single camera, so they are mainly suitable for the consumer electronics but can not satisfy the requirements for automobile auxiliary security, industries, 3D printing and other relevant fields in such aspects as depth image resolution, precision and scope of applications. In the same, the stereo matching calculation process is seriously subject to the influence of such factors as illumination, textures and shelters, and it has more errors, larger amount of calculation and more difficulty in generating real-time depth images.

SUMMARY OF THE INVENTION

In view of contents mentioned above, the present invention provides a method of binocular depth perception based on active structured light, which is an active visual mode based on structured light coding, first adopting a coded pattern projector (laser pattern projector or any other projection device) to project a structured light coded pattern on the projective space or target object, then obtaining the coded pattern by two cameras concurrently which are fixed on the same baseline as the code pattern projector and respectively located on both sides of the code pattern projector as the same equal in distance, then using two kinds of block matching methods to calculate the motion vectors, and finally completing depth calculation and depth compensation to generate high-resolution and high-precision image depth information (distance).

According to the present invention, a method of binocular depth perception based on active structured light includes such contents as follows:

Step 1: adopt an active visual mode of structured light coding, use a coded pattern projector to project a coded pattern and carry out structured light coding of the projective space, namely, carry out characteristics calibration in an active manner;

Step 2: the binocular cameras acquire and fix their respective reference coded patterns $R_l$ and $R_r$;

Step 3: the binocular cameras respectively acquire their input images $I_l$ and $I_r$ containing the coded patterns and complete preprocess the input images $I_l$ and $I_r$;

Step 4: use the input images $I_l$ and $I_r$ after being preprocessed to respectively detect the projection shadows of the target objects, respectively mark with $A_l$ and $A_r$;

Step 5: use two methods of block matching motion estimation to generate the offset respectively, namely the motion vectors, among which the binocular block matching calculation between the input images $I_l$ and $I_r$ is used to get the X-axis offset $\Delta x_{l,r}$ or Y-axis offset $\Delta y_{l,r}$; and among which the block matching calculation between the reference coded patterns $R_l$ and $R_r$ corresponding to the input images $I_l$ and $I_r$ to get the X-axis offset $\Delta x_l$ and $\Delta x_r$ or Y-axis offset $\Delta y_l$ and $\Delta y_r$;

Step 6: carry out depth calculation, including:

(6a) Select the offset $\Delta x_{l,r}$ or $\Delta y_{l,r}$ and combine the focal length f of the camera image sensor, the baseline distance 2S between two cameras and the dot pitch parameter $\mu$ of the camera image sensor to obtain the depth information $d_{l,r}$ for the central point o of the projection image block $block_{m \times n}$ based on calculation according to the formula for depth calculation;

(6b) Select the offset $\Delta x_l$ and $\Delta x_r$ or $\Delta y_l$ and $\Delta y_r$ and combine the given distance parameter d of the reference coded pattern, the focal length f of the camera image sensor, the baseline distance S between the camera and the coded pattern projector, as well as the dot pitch parameter $\mu$ of the camera image sensor to obtain the depth information $d_l$ and $d_r$ respectively for the central point o of the projection image block $block_{m \times n}$ corresponding to the same position in the input images $I_l$ and $I_r$ based on calculation according to the formula for depth calculation;

Step 7: depth compensation—use the depth information $d_l$ and $d_r$, combine the projection shadow areas $A_l$ and $A_r$ detected in Step 4 to compensate and correct the depth information $d_{l,r}$, and output the final depth value $d_{out}$ of the central point o on the projection image block $block_{m \times n}$;

Step 8: move the central point o of the projection image block to the next pixel in the same line, repeat the steps 5-7 to calculate the depth value corresponding to the next pixel, then follow such calculation sequence from left to right and from top to bottom line by line to obtain the depth information of the whole image based on point-by-point calculation.

The present invention combines the advantages of the binocular stereoscopic ranging and active structured light coding to achieve a substantial increase in precision and spatial resolution of the depth ranging. Moreover, the beneficial effects based on the technical solution of the present invention will be concretely demonstrated by further explanation in the following implementation examples.

DETAILED DESCRIPTION OF THE PREFERRED EMBODIMENTS

Here explain further details of the present invention based on concrete examples for implementation.

In general, the method for binocular depth perception of active structured light in the implementation example of the present invention is an active visual mode based on the structured light coding, adopting a coded pattern projector (laser pattern projector or any other projection device) to project a structured light coded pattern on the projective space or target object, then obtaining the coded pattern by two cameras concurrently which are fixed on the same baseline as the coded pattern projector and respectively located on both sides of the coded pattern projector as the same equal in distance, then using two kinds of block matching methods to calculate the motion vectors, and finally completing depth calculation and depth compensation to generate high-resolution and high-precision image depth information (distance).

Figure 1:
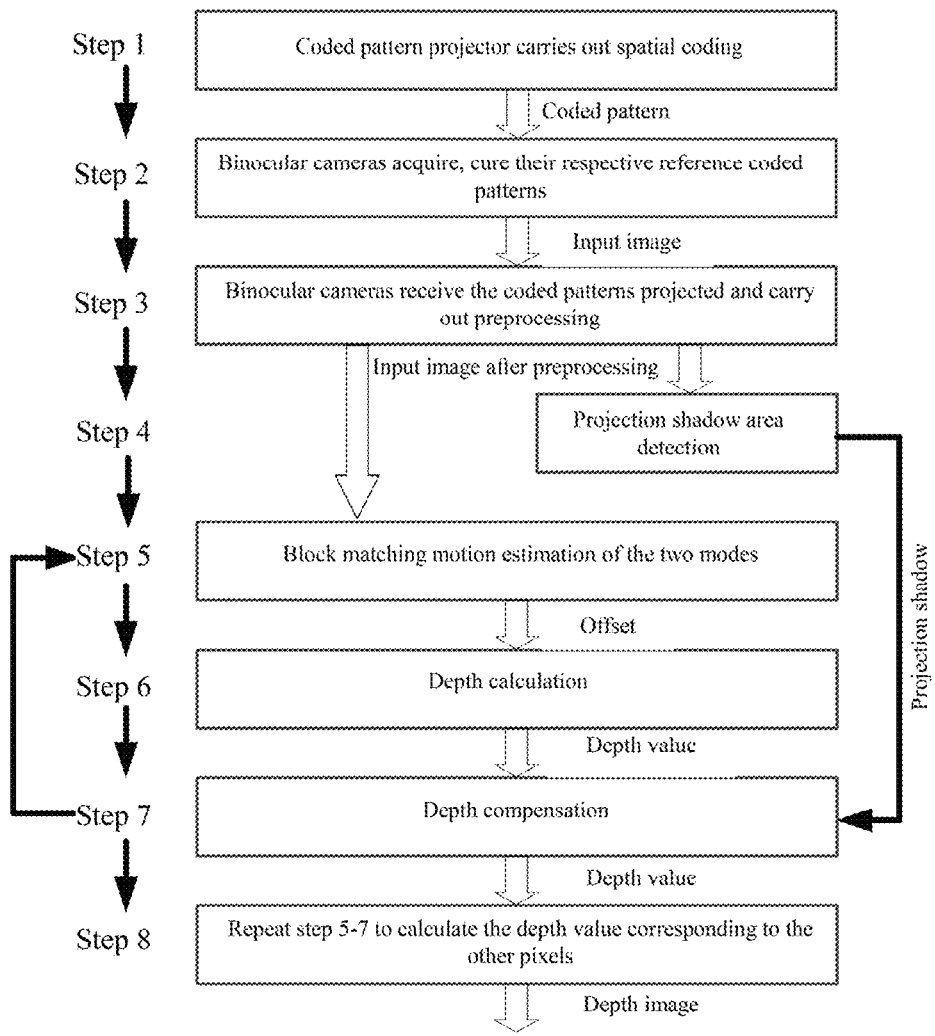
FIG. 1 illustrates the flow chart for the binocular depth perception method of an active structured light in the implementation example of the present invention.

FIG. 1 illustrates the overall process for the binocular depth perception method of an active structured light in the implementation example of the present invention. For clearer descriptions, this article next will take advantage of the FIGS. 2, 3, 4, 5, 6 and 7 to describe this method.

Step 1: the coded pattern projector carries out spatial coding. It adopts an active visual mode of structured light coding, using a coded pattern projector (laser pattern projector or any other projection device) to project a coded pattern so as to carry out structured light coding of the projective space or target object, namely, carrying out characteristic calibration in an active manner;

The above-mentioned coded pattern projector can be a laser speckle projector or laser character projector or any other projection device. Optimally, the laser speckle projector can project the coherent laser beams (infrared, visible light, ultraviolet and invisible light), which can form speckle images composed of scattered spots by means of interference imaging and object surface diffuse reflection; the laser character projector can project the patterns which are made by some regular characters or symbols; and also the projection device can project controllable coded patterns. The patterns projected by a coded pattern projector are usually fixed patterns or the projected patterns can be changed after synchronization to the image sensor for image receiving of the camera based on a certain control strategy; in a certain horizontal or vertical range, the features of the same pattern will not be repeated or distributed at random. The field of view (FoV) (including horizontal and vertical FoV) projected by the projector is generally greater than that of the receiving camera.

Figure 2:
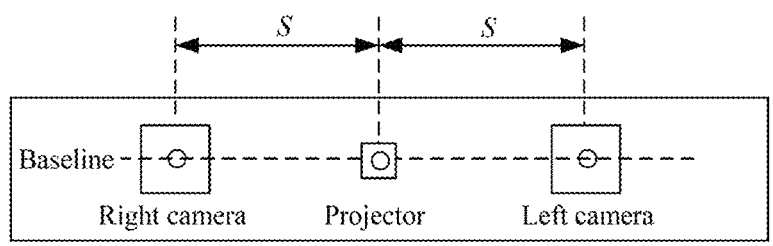
FIG. 2 illustrates the structure schematic for binocular cameras in the implementation example of the present invention.

Step 2: the binocular cameras acquire and fix their respective reference coded patterns $R_l$ and $R_r$;

Optimally, the binocular cameras is made up of two independent cameras which are identical in performance indexes (the same optical lens and image sensors) and arranged on both sides of the coded pattern projector symmetrically at the same distance to the left and right sides. Their optic axis are parallel to that of the coded pattern projector and kept on the same baseline to receive such coded patterns within a certain range of wavelength, as shown in FIG. 2. The focal length of the camera image sensor is f, the baseline distance from the camera to the coded pattern projector is S, and the dot pitch parameter of the camera image sensor is µ.

In practical applications, we can adjust the baselines of the two cameras according to different needs or use two cameras with different models or focal length to meet the requirements of different functions. Generally, the binocular cameras only receive those patterns projected by such projectors within a certain range of wavelength to minimize the interference from other light sources or light beams, and thus receive the patterns projected by the coded pattern projector clearly and steadily.

Before put into work, the binocular cameras need to acquire and fix their respective reference coded patterns at first as the reference benchmark for matching comparison. The above-mentioned reference coded patterns are acquired as follows: the coded pattern is projected onto the plane (this plane can be formed by a projection cloth and a panel, etc. used to present clear and stable images, and this plane can be called as the reference benchmark plane) vertical to the optical center axis (Z-axis) of the projector and with the vertical distance of d to the projector. The static images are acquired by the cameras, after preprocessed, then as the standard patterns are stored and fixed in the memory for matching benchmark and depth perception calculation. Optimally, a reference coded pattern of the laser speckle projector is a standard speckle pattern composed of multiple scattered spots, with the distance known as d. The reference coded patterns can be obtained by means of the above-mentioned methods, and such methods are only used to illustrate but not limit the above-mentioned implementation example, because the technicians in this field also can get such reference patterns in other ways.

Step 3: the binocular cameras respectively acquire the input images $I_l$ and $I_r$ containing the coded patterns and complete preprocess the input images $I_l$ and $I_r$;

The input images containing the coded patterns received by the binocular cameras can contain a target object, with depth information unknown, but it's within the effective range of the coded pattern projector and the camera.

The above-mentioned image preprocessing refers to adaptive and consistent processing of the input images with different characteristics in order to have the patterns clearer, reduce the false matching and noise interference, and help the depth perception calculation in the present invention by means of preprocessing of such input images. Optimally, the methods for preprocessing include video format conversion (e.g., Bayer, ITU601 and ITU656 video decoding or MIPI interface format conversion), color space conversion (for example, from RGB to YUV), and grey image adaptive denoising and enhancement, etc., and the enhancement method includes histogram enhancement, grey linear enhancement and binarization processing, etc., but not limited to these traditional methods for enhancement. The reference coded patterns and the real-time input images acquired by the binocular cameras all pass through the same image preprocessing module.

Figure 3:
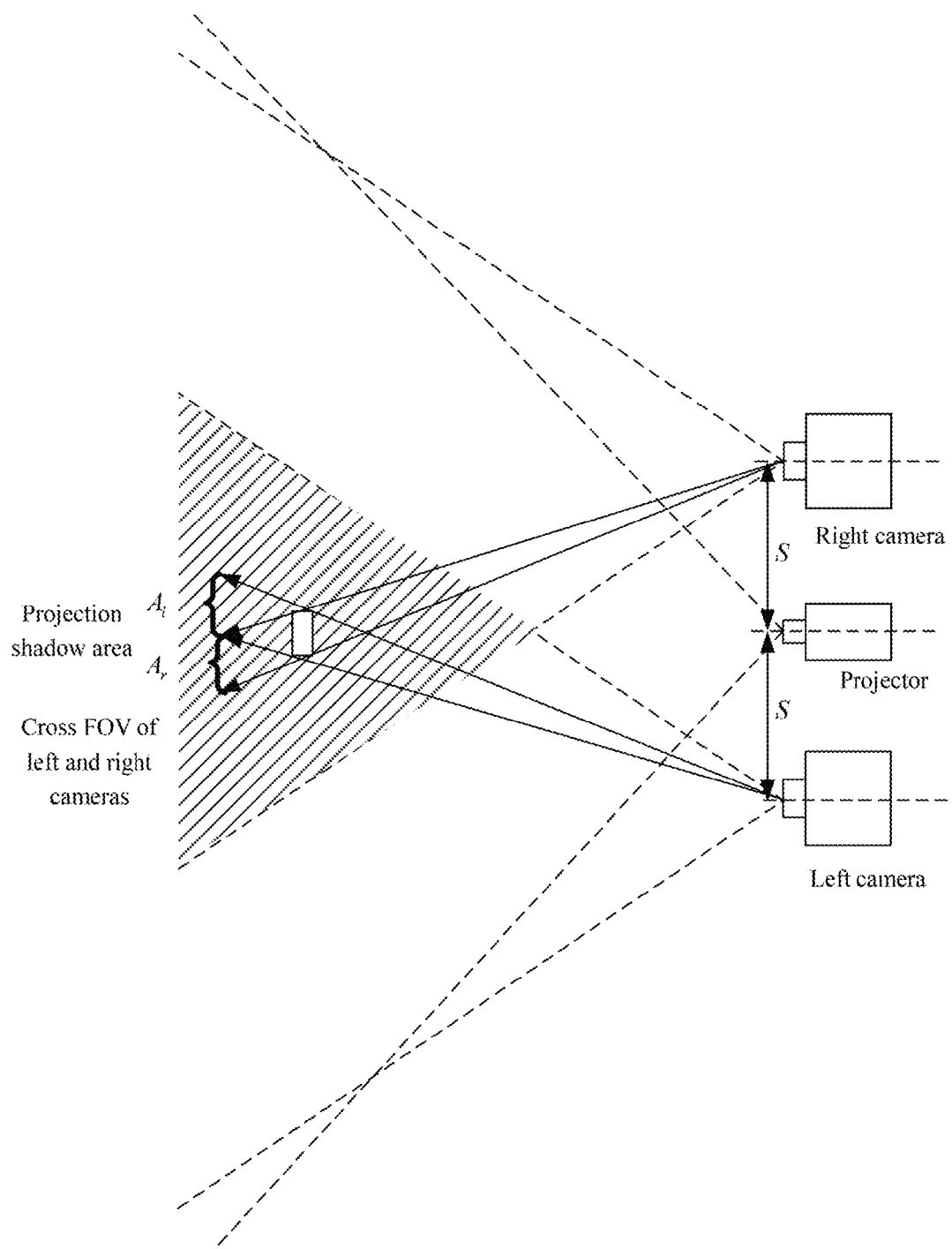
FIG. 3 illustrates the schematic diagram for the coded image projector, binocular cameras' field of view and projection shadows in the implementation example of the present invention.

Step 4: use the input images $I_l$ and $I_r$ after being preprocessed to respectively detect the projection shadows of the target objects, separately marked as $A_l$ and $A_r$;

The above-mentioned projection shadow area refers to an area (namely, the area free of coded patterns) at the edge of the target object because the image received by the camera is shaded by the edge of such target object during projection of the coded pattern projector, that is the area without coded pattern. As shown in FIG. 3 for a schematic projection shadow, it illustrates the projection shadow areas $A_l$ and $A_r$ due to shading of the target object while the left and right cameras are receiving the input images.

Optimally, the projection shadow areas can be detected as follows: detect the number of the feature points contained in an input image block of a certain size, and if such number is smaller than the predetermined threshold, then it argues that the area of this input image block is the projection shadow area. Take a laser speckle projector as an example, the coded patterns it has projected are speckle images composed of scattered spots and we can detect the number of the scattered spots in the input image block of a certain size, and if such number is smaller than the predetermined threshold, then it argues that the area of this input image block is the projection shadow area. The method for projection shadow detection in the present invention is not limited to detection of laser speckle images, but also can be used to detect the characteristic information of other coded patterns. Generally, such areas not within the effective range of the coded pattern projector and the camera can also be treated as projection shadow areas.

Figure 4:
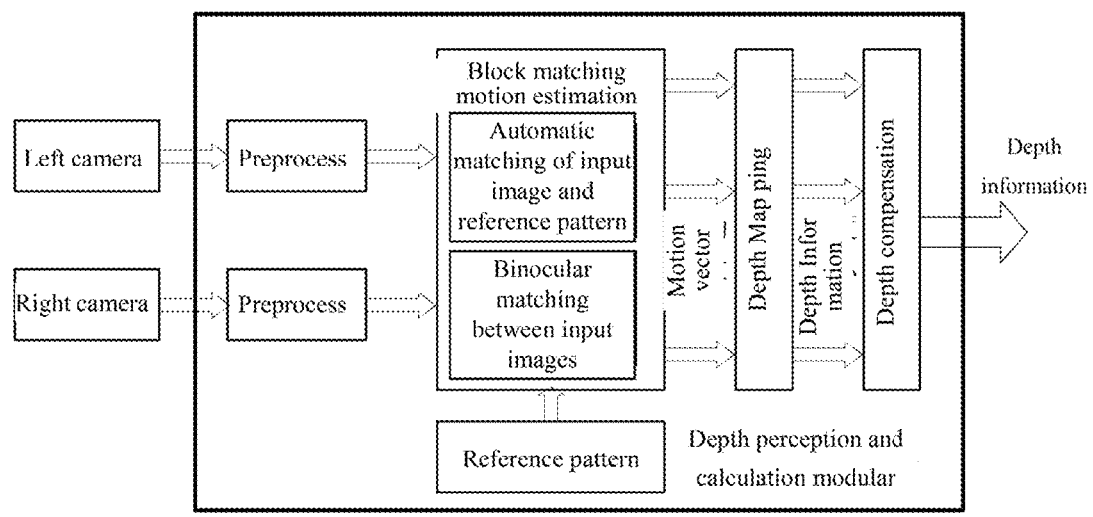
FIG. 4 illustrates the structure of the calculation module for depth perception of the binocular cameras in the implementation example of the present invention.

Step 5: use the two methods of block matching motion estimation to generate the offset respectively, namely the motion vectors, among which the binocular block matching calculation between the input images $I_l$ and $I_r$ is used to get the X-axis offset $\Delta x_{l,r}$ or Y-axis offset $\Delta y_{l,r}$ and among which the block matching calculation between the reference coded patterns $R_l$ and $R_r$ corresponding to the input images $I_l$ and $I_r$ to get the X-axis offset $\Delta x_l$ and $\Delta x_r$ or Y-axis offset $\Delta y_l$ and $\Delta y_r$;

The binocular cameras acquire the input image sequence at first, then send it into the module for depth perception calculation as shown in FIG. 4, and after preprocessing in Step 3, send into the module for block matching motion estimation to carry out matching calculation according to the method for block matching motion estimation of the two modes.

The first mode is the binocular block matching calculation between the input images $I_l$ and $I_r$, specifically as follows:

In the input image $I_l$, extract an input image block B' block$_{m \times n}$ of a certain size with the central point of o; in the input image $I_r$, extract a matching search window Match$_{M \times N}$ of a certain size and corresponding to the central point of o the input image block (the size of Match$_{M \times N}$ is M×N; M and N are both integers, equal or unequal; generally, M≥N, M>m, N≥n); and then in the matching search window Match$_{M \times N}$, extract all matching blocks match$_k$ of the same size as the input image blocks; the size is m×n, and the matching central points $o_k$ and k is integer, indicating the number of the matching blocks.

Then, calculate the similarity values match_value$_k$ between the input image block B' block$_{m \times n}$ and the $k_{th}$ matching blocks match$_k$ respectively, and such values are used as the indexes to measure the similarity of the image matching blocks.

Figure 5:
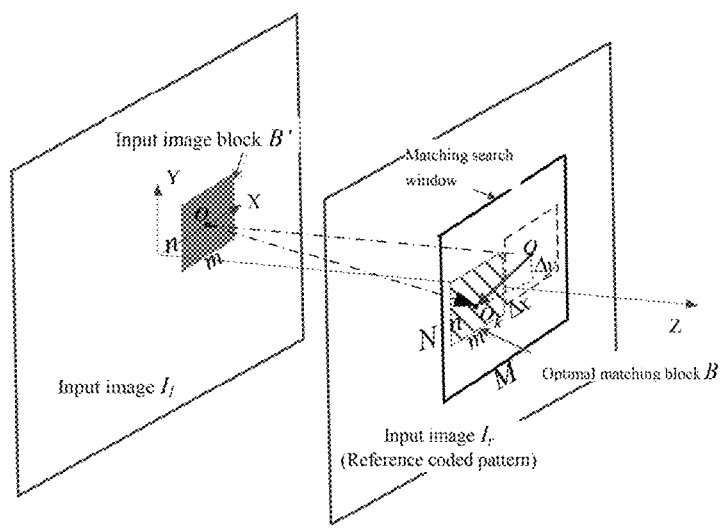
FIG. 5 illustrates the schematic of the input image block and the search for an optimal matching block in the implementation example of the present invention.

Finally, obtain the minimum value among all similarity values match_value$_k$, the matching block match$_k$ corresponding to such value is the optimal matching block B that the image block B' block$_{m \times n}$ is proposed to search for, and the position information corresponding to such minimum value is the offset $(\Delta x_{l,r}, \Delta y_{l,r})$ for the central point o of the image block block$_{m \times n}$, namely, the motion vector of such input image block B'. As shown in FIG. 5, the input image block refers to the grey area in the input image $I_l$, the optimal matching block refers to the slashed area in the matching search window of the input image $I_r$, the optimal offset is $(\Delta x_{l,r}, \Delta y_{l,r})$ between the central point $o_k$ of such slashed area and the central point o (this central point o corresponds to that of the input image block) of the matching search window block$_{M \times N}$, respectively indicating the displacement in the X and Y-axis directions, and the offset value is the coordinate values (x, y) of the central point o in the matching search window, respectively obtained by the X and Y-axis values d by the coordinate values (x', y') of the central point in the optimal matching block with the result changed into an absolute value and expressed in the number of pixels.

Another mode is the block matching calculation between the input images $I_l$, $I_r$ and its corresponding reference coded patterns $R_l$, $R_r$. Specific methods: as shown in FIG. 5, extract the input image block B' in the input image $I_l$ and then search for the image block B most matching B' (i.e., of the highest similarity) in its reference coded pattern $R_l$; extract the input image block B' in the input image $I_r$ and then search for the image block B most matching B' (i.e., of the highest similarity) in its reference coded pattern $R_r$; the method for searching for the optimal block matching is just the same as that of the binocular block matching motion estimation in the previous mode to obtain the optimal offset $(\Delta x_l, \Delta y_l)$ of the input image block in the input image $I_l$ and its optimal matching block, as well as the optimal offset $(\Delta x_r, \Delta y_r)$ of the input image block in the input image $I_r$ and its optimal matching block. The offset value is the coordinates (x, y) of the central point o in the matching search window corresponding to the input image block, respectively obtained by the X and Y-axis values subtracted by the coordinate values (x', y') of the central point in the optimal matching block and expressed in the number of pixels, and the positive and negative values correspond to the far and near relationship with the reference pattern plane in space.

Optimally, the size of the input image block is selected according to the relative uniqueness of this image block within a certain horizontal or vertical range, that is, this image block is different in characteristics from other image blocks of same size, so it can be recognized from other image blocks with identical size.

Optimally, the similarity value is the sum of absolute differences (SAD) between the pixels corresponding to the input image block and the matching block, but not limited to this method.

Figure 6:
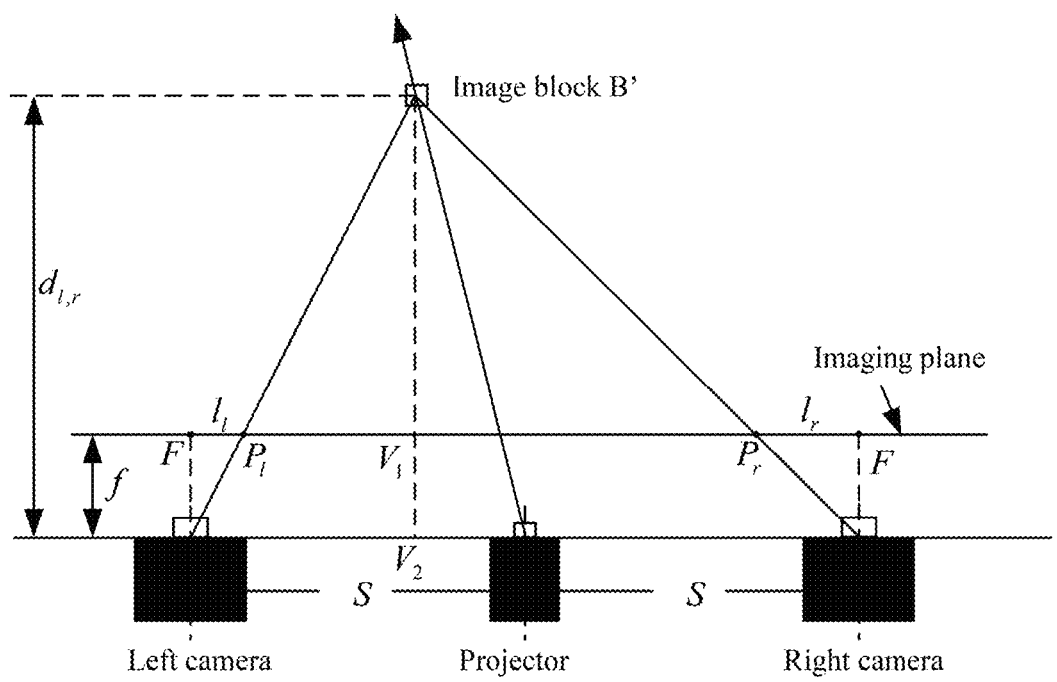
FIG. 6 illustrates the schematic for calculations of binocular block matching depth in the implementation example of the present invention.

Step 6: carry out depth calculation, including:

(6a) Select the offset $\Delta x_{l,r}$ or $\Delta y_{l,r}$ and combine the focal length f of the camera image sensor, the baseline distance between two cameras 2S and the dot pitch parameter $\mu$ of the camera image sensor to obtain the depth information $d_{l,r}$ for the central point o of the projection image block block$_{m \times n}$ based on calculation according to the formula for depth calculation, as shown in FIG. 6, calculation of the binocular camera depth;

Therein, if the binocular camera is arranged horizontally to the coded pattern projector, then select the offset $\Delta x_{l,r}$; if the binocular camera is arranged vertically to the coded pattern projector, then select the offset $\Delta y_{l,r}$.

In this implementation example, calculate $d_{l,r}$ according to the following formula for depth calculation, and here takes the horizontal offset $\Delta x_{l,r}$ as an input parameter:

$$d_{l,x} = \frac{2fS}{\Delta x_{l,r}\mu} \quad (1)$$

Where, the horizontal offset $\Delta x_{l,r}$ is the X-axis optimal offset of the optimal matching block B on the input image $I_r$ corresponding to the input image block B' of the input image $I_l$, that is, the x coordinate value of the central point in the matching search window of the input image $I_r$ subtracted by the x' coordinate value of the central point of optimal matching block B searched in matching search window by input image block B', with the result changed into its absolute value, expressed in the number of pixels.

(6b) Select the offset $\Delta x_l$ and $\Delta x_r$, or $\Delta y_l$ and $\Delta y_r$ and combine the given distance parameter of the reference code pattern d, the focal length f of the camera image sensor, the baseline distance S between the camera and the coded pattern projector, as well as the dot pitch parameter $\mu$ of the camera image sensor to obtain the depth information $d_l$ and $d_r$ respectively for the central point o of the projection image block block$_{m \times n}$ corresponding to the same position in the input images $I_l$ and $I_r$ based on calculation according to the formula for depth calculation;

Therein, if the binocular camera is arranged horizontally to the coded pattern projector, then select the offset $\Delta x_l$, $\Delta x_r$; if the binocular camera is arranged vertically to the coded pattern projector, then select the offset $\Delta y_l$, $\Delta y_r$.

In this implementation example, calculate $d_l$, $d_r$ according to the following formula for depth calculation, and here takes the horizontal offset $\Delta x_l$, $\Delta y_r$ as input parameters:

$$d_l = \frac{fSd}{fS + \Delta x_l \mu d}, d_r = \frac{fSd}{fS + \Delta x_r \mu d} \quad (2)$$

Where, $\Delta x_l$, $\Delta x_r$ indicate the X-axis optimal offsets respectively for the input image blocks of the input images $I_l$, $I_r$ to the corresponding optimal matching blocks, expressed in the number of pixels.

Step 7: depth compensation—use the depth information $d_l$ and $d_r$, combine the projection shadow areas $A_l$ and $A_r$ detected in Step 4 to compensate and correct the depth information $d_{l,r}$, and output the final depth value $d_{out}$ the central point o on the projection image block block$_{m \times n}$.

Figure 7:
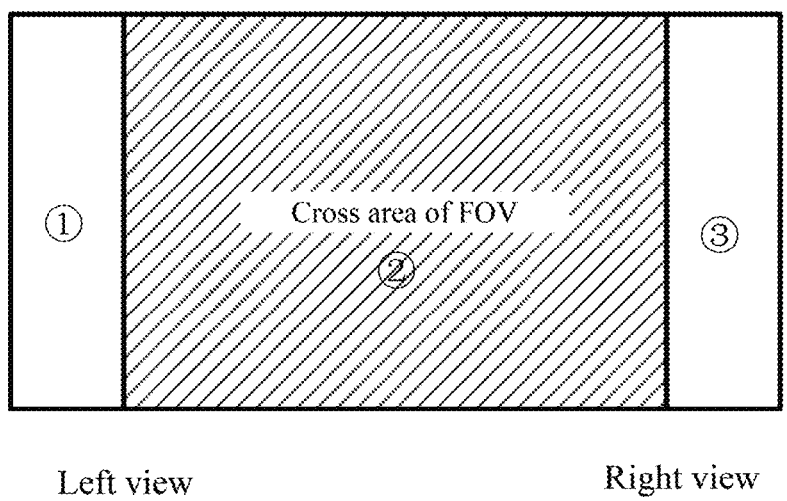
FIG. 7 illustrates the schematic for FOV (field-of-view) integration of the binocular cameras in the implementation example of the present invention.

According to the schematic diagram for FOV integration of the binocular camera as shown in FIG. 7, the specific method for depth compensation is as follows: if the central point o of the projection image block falls within the non-cross area ① in the left view, then select $d_l$ as the output $d_{out}$; if the central point o of the projection image block falls within the non-cross area ③ in the right view, then select $d_r$ as the output $d_{out}$; if the central point of the projection image block falls within the cross area ② in the left and right views, and for such non-projection shadow areas, if $|d_l - d_r| \le th_1$, and $$\left| d_{l,r} - \frac{d_l + d_r}{2} \right| > th_2$$

(which indicates that if the depth values $d_l$ and $d_r$ have no great difference while the depth value $d_{l,r}$ has a great difference from the average of $d_l$ and $d_r$, then it argues that $d_{l,r}$ is a depth error value while $th_1$ and $th_2$ represent the thresholds), then select $d_l$ or $d_r$ as the output $d_{out}$, or select $d_{l,r}$ as the output; for the projection shadow area $A_l$, select $d_r$ as the output $d_{out}$; for the projection shadow area $A_r$, then select $d_l$ as the output $d_{out}$.

The above example is only a specific method for depth compensation, but not limited to such method.

Step 8: move the central point o of the projection image block to the next pixel in the same line, repeat the steps 5-7 to calculate the depth value corresponding to the next pixel and follow such calculation sequence from left to right and from top to bottom line by line to obtain the depth information (distance) of the whole image based on point-by-point calculation. Similarly, it also can be used to calculate the depth information of the input image sequence.

As an example, the binocular camera in the present invention adopts two independent cameras identical in performance indexes (the same optical lens and image sensors) and arranged on both sides of the coded pattern projector symmetrically at the same distance to the left and right sides, with its optic axis parallel to that of the coded pattern projector and kept on the same baseline, but we can adjust the baseline of the two cameras in accordance with different requirements or adopt other two cameras different in focal length or model.

As an example, the projection shadow area in the present invention can be detected in such methods but not limited to that adopted in the example of the present invention; the search strategy of the matching block in the present invention adopts the conventional full-search block matching, but other kinds of improved search strategies can also be used; the similarity value is calculated in such method of sum of absolute differences (SAD), but not limited to such method; the method for depth compensation is not limited to that adopted in the example of the present invention too; all methods similar to the content flow in the present invention should be included in the range of the requirements for rights in the present invention.

In the present invention, the input images include a series of test images captured during movement of the described object and moreover, we can track the movement of the object within the target area according to the location as estimated.

As mentioned above in the present invention, we can splice the images after preprocessing of the two cameras and then calculate the depth. However, the process of splicing will increase a lot of redundant matching calculation and the details of this method has not been described in the implementation example, but it does not go beyond the spirit or range of the present invention, so should be included in the range of the requirements for rights mentioned above.

The above implementation example is completed in a specific system, but it has not restricted the present invention and the present invention can be applied to similar coded pattern projection and image sensor systems. The present invention not only supports the structured light modes from different laser sources, such as infrared light, visible light, ultraviolet light and invisible light, but also applies to the projection solutions of different patterns, such as round dots, blocks, cross shapes, stripe patterns. Therefore, any modification and perfection within the spirit and range of the present invention should be included in the range of the requirements for rights as mentioned above.

What is claimed is:

1. A method of binocular depth perception based on active structured light, comprising the following steps of:

Step 1: projecting coherent laser beams, by a coded pattern projector, with a coded pattern to carry out structured light coding for a target object with an unknown depth;

Step 2: arranging a first camera and a second camera symmetrically at the same distances on the left side and right side of the coded pattern projector to acquire and fix their respective reference coded pattern $R_l$ and reference coded pattern $R_r$, the first camera and the second camera being two separate and distinct components and each having the same or substantially the same optical lens and image sensor, and sharing the same baseline with the coded pattern projector and receiving the coded pattern within the range of a wavelength;

Step 3: acquiring input image $I_l$, by the first camera, and acquiring input image $I_r$, by the second camera, each of the input image $I_l$ and the input image $I_r$ containing the coded pattern and the target object and preprocessing the input images $I_l$ and $I_r$, wherein the preprocessing includes video format conversion, color space conversion, and grey image adaptive denoising and enhancement;

Step 4: using the input image $I_l$ and the input image $I_r$ after being preprocessed to detect projection shadow areas $A_l$ and $A_r$ of the target object respectively, wherein projection shadow area $A_r$ located behind the left side of the target object is detected in the input image $I_l$ and projection shadow area $A_l$ located behind the right side the target object is detected in the input image $I_r$;

Step 5: performing two matching motion estimation: a first block matching motion estimation based on the symmetric arrangements and equal distances of the first camera and the second camera from the coded pattern projector and a second of block matching motion estimation to generate the offset respectively, wherein the first block matching motion estimation is to perform a binocular block matching calculation between a first input image block of the input image $I_l$ and a corresponding matching image block of the input image $I_r$, based on the symmetric arrangements and equal distances of the first camera and the second camera from the projector and get an X-axis offset $\Delta x_{l,r}$ or a Y-axis offset $\Delta y_{l,r}$; and the second block matching motion estimation is to perform (1) a first block matching calculation between the first input image block of the input image $I_l$ image and a corresponding matching image block with the reference coded pattern $R_l$ to get an X-axis offset $\Delta x_l$ and a Y-axis offset $\Delta y_l$ and (2) a second block matching calculation between a second input image block of the input image $I_r$ and a corresponding matching image block with the reference coded pattern $R_r$, to get an X-axis offset $\Delta xr$ or a Y-axis offset $\Delta yr$, wherein the block matching motion estimation is based on similarity values between input images and corresponding matching images;

Step 6: carrying out depth calculation, including:

(6a) selecting the X-axis offset $\Delta x_{l,r}$ or $\Delta y_{l,r}$ and combining the focal length f of the image sensor, the baseline distance between the first camera and the second camera S and a dot pitch parameter μ of the image sensor to obtain depth information $d_{l,r}$ for a central point 0 of an image block $_{mxn}$;

(6b) selecting the X-axis offset $\Delta x_l$ and $\Delta x_r$ or the Y-axis offset $\Delta y_l$ and $\Delta y_r$ and combining a given distance parameter d of the reference coded pattern $R_l$ and reference coded pattern $R_r$, the focal length f of the image sensor, the baseline distance s between the first camera and the coded pattern projector, as well as the dot pitch parameter μ of the image sensor to obtain depth information $d_l$ and $d_r$ respectively for the central point 0 of the image block$_{mxn}$ corresponding to the same position in each of the input image $I_l$ and the input image $I_r$;

Step 7: performing depth compensation, including, using the depth information $d_l$ and $d_r$, combining the projection shadow areas $A_l$ and $A_r$ detected in Step 4 to compensate and correct the depth information $d_{l,r}$, and outputting a final depth value $d_{out}$ of the central point 0 on the image block $_{mxn}$;

Step 8: moving the central point 0 of the image block$_{mxn}$ to a next pixel in the same line, repeating the steps 5-7 to calculate a depth value corresponding to the next pixel and following such calculation sequence from left to right and from top to bottom line by line to obtain the depth information of the input image $I_l$ and the input image $I_r$ each comprising the target object based on point-by-point calculation.

2. The method according to claim 1, wherein the reference coded $R_l$ and reference coded pattern $R_r$, as mentioned in Step 2 are standard patterns stored and cured in the memory for matching benchmark and depth perception calculation after preprocessing of static images acquired by the first camera and the second camera when the coded pattern projector projects code patterns onto a plane vertical to the optical center axis of the coded pattern projector with the distance of d to the coded pattern projector.

3. The method according to claim 1, wherein the projection shadow area detection as mentioned in Step 4 is determined by detecting the number of the feature points contained in the image block$_{mxn}$.

4. The method according to claim 1, wherein in Step (6a), if the first camera and the second camera are arranged horizontally to the coded pattern projector, then selecting the X-axis offset $\Delta x_{l,r}$; if the first camera and the second camera are arranged vertically to the coded pattern projector, then selecting the offset $\Delta y_{l,r}$.

5. The method according to claim 1, wherein in Step (6a), if $\Delta x_{l,r}$ is selected, then the formula for depth calculation is as follows:

$$d_{l,r} = \frac{2fS}{\Delta x_{l,r}\mu}. \qquad (1)$$

wherein the X-axis offset $\Delta x_{l,r}$ is an X-axis optimal offset of an optimal matching block B on the input image $I_r$ corresponding to an input image block B' of the input image $I_l$, and wherein the X-axis optimal offset is the x coordinate value of the central point in the matching search window of the input image $I_r$ subtracted by the x' coordinate value of the central point of optimal matching block B searched in matching search window by the input image block B', and wherein the X-axis optimal offset is changed into a value expressed in the number of pixels.

6. The method according to claim 1, wherein in Step (6b), if the first camera and the second camera are arranged horizontally to the coded pattern projector, then selecting the X-axis offset $\Delta x_l$ and $\Delta x_r$; if the first camera and the second camera are arranged vertically to the coded pattern projector, then selecting the Y-axis offset $Y_l$ and $Y_r$.

7. The method according to claim 1, wherein in Step (6b), if $\Delta x_l$ and $\Delta x_r$ are selected, then the formula for depth calculation is as follows:

$$d_l = \frac{fSd}{fS + \Delta x_l \mu d}, \quad d_r = \frac{fSD}{fS + \Delta x_r \mu d}, \quad (2)$$

wherein $\Delta x_l$, $\Delta x_r$ indicate X-axis optimal offsets respectively for input image blocks of the input images $I_l$ and $I_r$ to corresponding optimal matching blocks, expressed in the number of pixels.

8. The method according to claim 1, wherein in Step (7), the specific method for depth compensation is as follows:
  if the central point 0 of the projection image block falls within the left view of a non-cross area, then selecting $d_l$ as the output $d_{out}$;
  if the central point 0 of the projection image block falls within right view of the non-cross area, then selecting $d_r$ as the output $d_{out}$;
  if the central point 0 of the image block falls within the cross area, and for non-projection shadow areas, when there is no difference between $d_l$ and $d_r$, and there is a difference between $d_{l,r}$ and the average of $d_l$ and $d_r$, then selecting $d_l$ or $d_r$ as the output $d_{out}$, otherwise selecting $d_{l,r}$ as the output; and
  if the central point 0 of the image block falls within the cross area,
    for the projection shadow area $A_l$, selecting $d_r$ as the output $d_{out}$;
    for the projection shadow area $A_r$, then selecting $d_l$ as the output $d_{out}$, wherein $th_l$ is a first threshold and the $th_2$ is a second threshold.

* * * * *